Figure 1:
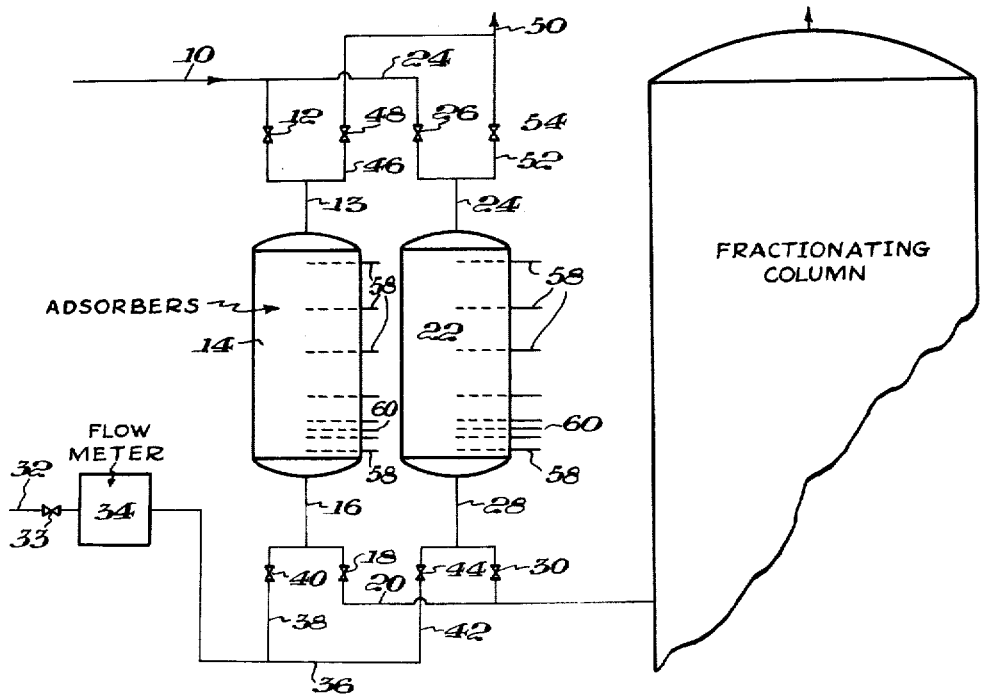

July 31, 1951

I. ROBERTS 2,562,334

REGENERATION OF AN ADSORPTIVE BED CONTAINING
CONSTITUENTS WITH A HIGH VAPOR PRESSURE

Filed Sept. 26, 1950

INVENTOR.
Irving Roberts
BY
Brown, Critchlow, Flick & Peckham
his ATTORNEYS.

Patented July 31, 1951

2,562,334

UNITED STATES PATENT OFFICE 2,562,334

REGENERATION OF AN ADSORPTIVE BED CONTAINING CONSTITUENTS WITH A HIGH VAPOR PRESSURE

Irving Roberts, Jeannette, Pa., assignor to Elliott Company, Jeannette, Pa., a corporation of Pennsylvania Application September 26, 1950, Serial No. 186,894

15 Claims. (Cl. 34—34)

This invention relates to the regeneration of an adsorptive bed containing constituents with high vapor pressures. More particularly, the invention relates to the regeneration of a silica gel adsorptive bed having vapors such as acetylene and carbon dioxide adsorbed thereon.

In the separation of oxygen from air, the air is cooled by passage through heat exchangers or regenerators to a temperature close to its dew point, and then enters fractionating apparatus for separation into oxygen and nitrogen products. The cooling of the air, while serving the purpose of bringing the air to the temperature of the fractionating apparatus, has the additional effect of removing impurities such as water, carbon dioxide and acetylene, which are condensed on the heat transfer surfaces of the heat exchangers or regenerators. However, such removal of impurities is not complete, since the cold air leaving the heat transfer apparatus contains measurable traces of carbon dioxide and acetylene. These traces of impurities, if allowed to enter the fractionating column over a long period of time cause fouling of the trays and reboiler surfaces, and introduce the hazard of an explosion due to the accumulation of acetylene in the presence of liquid oxygen. This problem has been solved by passing the cold air through a bed of granular adsorptive material, such as silica gel, to remove the traces of carbon dioxide and acetylene, before passing the air into the fractionating column.

Because of the comparatively small quantities of carbon dioxide and acetylene in the cold air, and because of the high adsorptive capacity of silica gel at temperatures close to the dew point of air, such a bed can be used for a long period before regeneration is necessary. To allow time for regeneration, two adsorbers are usually provided, one being operated while the other is being regenerated. For regeneration, it is necessary to raise the temperature of the silica gel to the point where the vapor pressures of the adsorbed impurities are increased sufficiently to permit the vapors to be easily swept out of the bed. Both the warming of the silica gel and the sweeping out of the desorbed vapors may be accomplished in a single operation by passing a stream of warm inert gas through the bed until the impurities are removed. This method of regeneration is commonly used for absorptive beds operating at atmospheric temperature or above, as, for example, for silica gel or alumina adsorbers used in the drying of gases. For low temperature adsorbers, however, this method suffers from a serious disadvantage as may be seen from the following discussion.

Consider, for example, a silica gel bed several feet thick in the direction of flow, which has been removing carbon dioxide and acetylene from an air stream at a temperature of minus 305° F. At the completion of the operating cycle, the entire bed is uniformly at the temperature of minus 305° F., and is almost saturated with impurities. An inert gas for regeneration, may be a by-product stream of clean, dry nitrogen at about atmospheric temperature, say 95° F., and at a pressure sufficiently above atmospheric to overcome the frictional resistance of the bed. It is also assumed that the bed is arranged for vertical flow of gas, and that during regeneration the nitrogen will be passed through the bed in an upward direction. When the nitrogen flow is started, it is observed from thermocouples placed in the silica gel bed that the temperature of the entire bed does not rise uniformly with time. Instead, the silica gel at the bottom edge of the bed is heated rapidly to substantially 95° F., while the temperature of the remainder of the bed remains substantially unaffected. As the nitrogen flow continues, it is found that the portion of the silica gel at the bottom of the bed which reaches 95° F. gradually increases in length, while the upper portion, still at substantially minus 305° F., decreases in length. Between these two zones, an intermediate portion of the silica gel shows a very steep temperature gradient, the temperature changing the full difference of 400° F. within a length of only 1 to 3 inches. With continued nitrogen flow, this intermediate zone of high temperature gradient gradually moves upwards through the bed, and the entire heating process may be visualized as a wave, 400° F. in extent, which passes slowly through the bed from one end to the other.

By plotting at any instant, the temperature at each position in the bed as ordinate against the length in the diretcion of flow as abcissa, there is observed a substantially horizontal line for the 95° F. zone, an almost vertical line for the intermediate zone, and a substantially horizontal line for the minus 305° F. zone. Because of the nearly vertical line which represents the wave front, this effect has been called a "square-wave" phenomenon. It is explained by the fact that the porous granules of silica gel expose a very large amount of surface for heat transfer to the nitrogen, so that the nitrogen is cooled to substantially the silica gel temperature within a very short length of flow path. The nitrogen which has been so cooled can impart no further heat to the silica gel, and passes through the remainder of the bed without further change. Simultaneously, at the beginning of the flow path, the silica gel granules are constantly exposed to nitrogen at its initial temperature and are therefore rapidly warmed to this temperature. When this silica gel reaches 95° F., it can receive no further heat from the nitrogen, and the nitrogen begins to heat the adjacent silica gel particles in the direction of flow. In this way, the warm zone continually increases in length while the cold zone continually decreases in length, without substantial change in the temperature level of either zone.

One factor which is important in bringing about this phenomenon is the granular character of the silica gel. The poor contact between adjacent particles reduces the thermal conductivity in the direction of flow so that the tendency towards equalization of temperature by heat conduction through the solid is negligible. Thus, the same heating phenomenon occurs even with metallic granules, which, while having a high intrinsic conductivity, are effectively insulated from each other by the small area of physical contact.

The degree to which the temperature distribution approaches an ideal "square-wave" depends upon the rate of flow of gas through the bed, as well as upon the amount of exposed heat transfer surface per unit weight of the adsorbent particles. It is possible to decrease the temperature gradient, i. e., increase the length of the intermediate zone, by increasing the velocity of gas flow through the bed. However, this is limited by the fact that at high velocities, the turbulence tends to grind the particles against each other, causing dusting and deterioration. At flow rates in the practical range, for the example given here, the length of the zone of temperature change is about 1 to 3 inches.

Considering now the adsorbed impurities, it is apparent that during the "square-wave" heating process, the nitrogen, in passing through the intermediate zone, will vaporize the impurities, and, in passing into the minus 305° F. zone, will redeposit them. Thus, during most of the heating period, the nitrogen, leaving the top of the bed at substantially minus 305° F., carries with it only a negligible quantity of impurities. The bulk of the impurities are carried out only when substantially the entire bed has been heated to 95° F., i. e., when the nitrogen discharge temperature rises considerably above minus 305° F.

Therefore, the use of this method of regeneration requires that substantially the entire bed be heated to the entering temperature of the regeneration gas. This is a serious disadvantage in the case of an oxygen plant, since the entire bed must be recooled to operating temperature when the adsorber is again placed on stream. This cooling is done by the passage of the cold air through the unit, so that, during the early portion of the operating cycle, the air enters the fractionating column with considerable superheat. This results in vaporization of liquid from the trays of the column, reducing the output of oxygen to as little as 80 to 90 percent of the normal plant capacity for a period of several days.

It is actually unnecessary to heat the entire bed 400° from minus 305° to 95° F. for efficient vaporization of impurities in the example cited. Increasing the temperature of the bed by 60° to 100°, say 80° to minus 225° F., causes a sufficient increase in the vapor pressures of carbon dioxide and acetylene that these impurities may be removed with a relatively small flow of nitrogen. If the temperature rise of the bed could be limited to say 80° F. instead of 400° F., this would reduce the refrigeration requirement by a factor of 5, so that the effect of placing the regenerated unit on stream would be considerably reduced. However, as shown above, the "square-wave" effect prevents such a limitation in temperature rise when 95° F. gas is used for regeneration.

The primary object of the present invention is to provide a method by which a bed of granular adsorptive agent may be regenerated to remove adsorbed material with a minimum rise in temperature above the temperature at which the material is adsorbed.

A further object of the invention is to provide a method by which a bed of granular adsorptive agent may be raised to a uniform effective temperature for vaporizing adsorbed material for regeneration of the agent with the introduction of a minimum quantity of heat into the bed.

With these and other objects in view, the invention consists in the method of regenerating beds of solid adsorption material as hereinafter described and particularly as defined in the appended claims.

Figure 2:
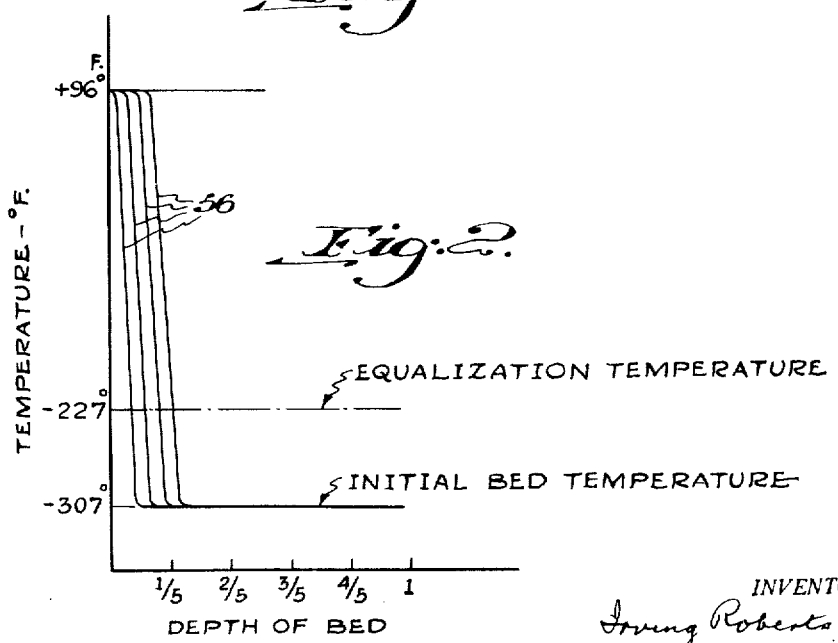

In the accompanying drawings, Fig. 1 is a diagrammatic view of an apparatus in which the preferred method of regeneration of an adsorption agent may be carried out; and Fig. 2 is a curve diagram illustrating the temperature rise in a bed of silica gel when heating the bed with a warm gas wherein the "square-wave" phenomenon is involved.

The preferred embodiment of the invention is illustrated and described as used for the removal of acetylene and carbon dioxide from air which is being fractionated for the separation of oxygen therefrom. In accordance with the method, the air is dried and cooled to −265° F. to −310° F. by heat interchange with one of the separation products prior to entering the fractionating equipment. Most of the carbon dioxide is solidified and deposited in the heat exchanger in which the air was cooled, but to prevent the acetylene and the remaining carbon dioxide in the refrigerated air from entering the fractionating column, the cooled air is sent through an adsorber in contact with silica gel or the like which adsorbs the carbon dioxide and acetylene. Since the amount of acetylene and carbon dioxide in the cold air is very small, an adsorber may be used for a month to six weeks before the adsorbed material must be removed and the adsorption agent regenerated.

For the adsorption of acetylene and carbon dioxide from the air, referring to the drawings, the dry cooled air is introduced through a line 10 past a valve 12 into a line 13 entering the top of an adsorber 14 and passes down through a vertical bed of silica gel which is several feet deep. The purified air then flows through a line 16 past a valve 18 into a line 20 leading to a fractionating column for the separation of oxygen and nitrogen therefrom. A second adsorber 22 is mounted adjacent the adsorber 14, the top of which is connected with the line 10 by a line 24 having a valve 26. The dried cooled air may be passed down through a bed of silica gel in the adsorber 22 for removing acetylene and the remaining carbon dioxide from the air, and the purified air will then leave the bottom of adsorber 22 through line 28 and pass through a valve 30 into the line 20 and flow to the fractionating column. Only one of the adsorbers 14 and 22 is used at a time for the adsorption of the high vapor pressure constituents from the air. While one adsorber is being used for adsorption, the silica gel in the other adsorber is being regenerated for the removal of the acetylene and carbon dioxide therefrom.

The heating of the adsorbing agent for regeneration thereof is carried out in two heating periods; a heat supply period and a heat equalization period. In the heat supply period, a neutral gas, such as nitrogen that is separated along with oxygen in the main process, is used at substantially atmospheric temperatures, that is from 70° to 100° F., and passed from a line 32 through a valve 33 to a flow meter 34 and then through a line 36 to one of the adsorbers to be used as a regeneration gas. The line 36 is connected by a line 38 through a valve 40 to the line 16 at the bottom of the adsorber 14. Also, the line 36 is connected by a line 42 having a valve 44 with the line 28 at the bottom of the adsorber 22. When the adsorption agent in the adsorber 14 is being supplied with heat for regeneration, the heating gas from line 36 is passed through line 38, opened valve 40 and line 16 into the bottom of the bed of adsorption agent, then up through the bed and out of the top of the adsorber through the line 13 to a line 46, having an opened valve 48 therein, to a line 50 exhausting to the atmosphere. When heat is being supplied to adsorber 14, valves 12, 18, 44 and 54 are closed. To supply the heat for the regeneration of the adsorption agent in adsorber 22, the heating gas from line 36 is passed through line 42, opened valve 44 and line 28 into the bottom of the bed of adsorption agent, then up through the bed and out of the top of the adsorber through a line 52 and opened valve 54 to exhaust line 50. When the heat is being supplied to the adsorber 22, valves 26, 30, 40 and 48 are closed.

The amount of heat to be introduced into a bed for the heat supply period depends upon the temperature of the bed, the temperature of the heating nitrogen and the specific heats of the adsorption agent and the heating nitrogen. This heat input should be the minimum amount of heat which will raise the temperature of the entire bed to a point where the adsorbed materials will be vaporized to be carried out of the adsorption bed with gas passing through the bed. The cooled air passing downward through the silica gel bed during the adsorption cycle has a temperature between −265° F. to −310° F., and the bed attains this temperature during the adsorption cycle. A rise in the temperature throughout the bed of approximately 80° F. will cause the carbon dioxide and acetylene to be vaporized. Such a temperature rise is substantially one-fifth of the temperature differential between the temperature of the heating gas and the temperature of the adsorption bed. Accordingly, by putting in about one-fifth the amount of heat required to raise the temperature of the entire bed to the temperature of the heating gas, the adsorbent contaminant can be vaporized to be carried out of the bed with the gas. With an adsorption agent such as silica gel that will be heated in accordance with the "square wave" phenomenon, about the lowest one-fifth of the bed will be raised to the temperature of the heating gas during the heat supply cycle. Since it is necessary to raise the temperature of the entire bed to a uniform temperature, the equalization period of the regeneration cycle is required, as now will be described.

Fig. 2 is a curve showing the temperature is a given vertically arranged adsorption bed of silica gel during the heat supply period for the removal of carbon dioxide and acetylene adsorbed in the bed. The bottom of the bed, Fig. 2, where the warming nitrogen enters will have a temperature of approximately 96° F., and the top of the advancing wave front at a distance of one to three inches from the bottom of the layer will have a temperature of −307° F., which is the temperature of the adsorption bed. When the wave front has advanced at the head of the successive layers in the bed, which are illustrated by the parallel lines 56, to the extent of one-fifth of the height of the bed, the temperature of the lower one-fifth of the bed will be substantially the temperature of the incoming nitrogen, while the upper four-fifths of the bed will be at a temperature of −307° F. The supply of heating gas is then cut off and the bed is allowed to stand to permit the heat in the bottom of the bed to rise by convection of nitrogen through the rest of the bed so that the temperature of the entire bed will reach an equalization temperature, illustrated in Fig. 2 by a dot-and-dash line, at approximately −227° F.

This convection heating of the adsorption agent will progress upwardly through a bed when the heating gas is introduded at the bottom of the bed, or it will advance horizontally (but more slowly) through the bed when the gas is introduced at one side of the bed. Regeneration can not be accomplished by introducing the heating gas at the top of the bed, because convection currents will not be set up between the heated upper portion of the bed and the underlying cold portion.

At the end of the heat supply period, the flow of warm gas is cut off by closing valve 40 or 44 in accordance with the adsorber being regenerated. At the same time, the upper valve 48 or 54 will be closed to prevent the infiltration of air into the bed of adsorptive material while its temperature is being equalized. The heat supply period is preferably carried out slowly, extending over a period of four to five hours, to limit the nitrogen flow rate and the pressure drop through the bed. The equalization temperature period will require several days to one week, depending on the particular bed arrangement.

When the adsorption bed temperature has become equalized, as indicated by thermocouples 58 distributed from the top of the bottom of the bed, a set of valves, for example, valves 40 and 48 of the adsorber 14, assuming that this adsorber is being regenerated, are opened and a sufficient amount of warm nitrogen is passed through the bed to sweep out the vaporized contaminants.

The measurement of the volume of the gas at a predetermined temperature being supplied to a tower to supply the heat for regeneration of the adsorption agent therein is illustrated in the drawings as being accomplished by a flow meter 34. In place of a flow meter, the heat input into an adsorber may be determined by means of a series of thermocouples 60 which are preferably arranged at closely separated vertical heights near the point where the desired amount of heat will have been supplied to the bed. When the temperature of the bed reaches the temperature of the heating gas at a particular thermocouple located at a predetermined level, the supply of gas may be cut off. The flow meter 34 may advantageously be used with the thermocouple 60 in measuring the heat input to the adsorption bed. However the flow meter may be omitted and the heat input measured solely by the thermocouples 60.

As an example of the regeneration operation, an adsorber which contains 270 cubic feet of silica gel or a total of 13,500 pounds of silica gel which operates at an adsorption temperature of −307° F. is treated with 784 pounds per hour of nitrogen at 96° F. for a period of four hours. Calculations show that this amount of nitrogen will add enough heat to the silica gel to raise its temperature to approximately −227° F., but before that temperature will be distributed uniformly throughout the bed, it must be allowed to stand for about six days. Otherwise, the temperature of the lower fifth of the bed will be about 96° F., while the temperature of the rest of the bed will remain −307° F. After the temperature equalization period has expired, about 20 pounds of nitrogen at atmospheric temperature is passed upward through the bed to purge the bed of the vaporized acetylene and carbon dioxide. With this operation, the adsorber may be operated for one month on the cycle for adsorbing acetylene and carbon dioxide and can be regenerated in about one week. When the regenerated silica gel is again brought into the adsorption cycle, the cooled air flowing downward through it will again reduce the temperature of the silica gel bed from −227° F. to −307° F.

The regeneration of the adsorption agent may be carried out with any neutral gas that is dry. For example, nitrogen or dry air may be used. The regenerating gas is preferably used at atmospheric temperature in order to avoid the requirement of heating apparatus to raise its temperature, or of a heat exchanger for lowering its temperature. This neutral gas, however, may be used at higher temperatures and thus decrease the volume of gas required to raise the temperature of the adsorption bed to a point where the adsorptive materials will be vaporized.

The present method is applicable to the regeneration of granular adsorption agents which will adsorb gases having high vapor pressures. The method is particularly adapted for the regeneration of granular adsorptive material when the adsorptive material is used for adsorbing gas at temperatures of several hundred degrees below atmospheric temperature. Such gases generally have a boiling point below zero degrees F. Silica gel, alumina, activated alumina and charcoal are well adapted for the adsorption of carbon dioxide and acetylene to separate them from gases such as air. Other adsorption agents which will selectively separate high vapor pressure gases from low vapor pressure gases may be used in accordance with the present method.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A method of regenerating a bed of a granular solid adsorption agent having materials adsorbed thereon comprising passing a dry neutral gas having a temperature several hundred degrees higher than the temperature of the adsorption agent through the porous bed to raise the temperature of a minor fractional portion of the bed to substantially the temperature of the gas, discontinuing said flow of warm gas when it has supplied sufficient heat to said portion of the bed to raise the temperature of the entire bed slightly above that regeneration temperature at which the adsorbed material will be converted into vapor, allowing the partially heated bed to stand for a period long enough for the temperature throughout the bed to be equalized at said regeneration vaporization temperature, and purging said vapor from the bed at the end of the equalizing period.

2. The method defined in claim 1 in which the adsorption agent is one of the class consisting of silica gel, alumina, activated alumina and charcoal.

3. The method defined in claim 2 in which the adsorbed material has a high vapor pressure with boiling point below 0° F.

4. The method defined in claim 1 in which the neutral gas is nitrogen.

5. The method defined in claim 1 in which the adsorption agent is silica gel and the adsorbed materials are carbon dioxide and acetylene.

6. The method defined in claim 5 in which the adsorption temperature is between −265° F. and −310° F., the regeneration temperature 60° to 100° above the adsorption temperature, and the warm gas is nitrogen with an initial temperature between 75° and 100° F.

7. The method defined in claim 6 in which approximately one-fifth of the bed being regenerated is heated to the warm gas temperature during the heat supply period.

8. The method defined in claim 6 in which the heat supply period is of the order of four hours and the equalizing period is of the order of six days.

9. The method defined in claim 1 in which the warm gas is introduced at the bottom of the bed and passed vertically upward through the bed.

10. The method defined in claim 1 in which the warm gas is introduced at the side of the bed and passed horizontally through the bed.

11. The method defined in claim 1 in which the gas at a predetermined temperature is metered to define the total heat input for obtaining the equalization temperature of the entire bed.

12. The method defined in claim 1 in which temperatures of a vertical bed of adsorption agent are taken adjacent to the top of the fractional minor portion to determine when to cut off the gas supply when the temperature of the fractional portion of the bed is raised to the temperature of the gas, so that a proper heat input will be supplied to obtain the desired equalization temperature of the entire bed.

13. A method of regenerating a bed of a granular solid adsorption agent having material adsorbed thereon comprising passing a dry neutral gas having a temperature several hundred degrees higher than the temperature of the adsorption agent through the porous bed to raise the temperature of a minor fractional portion of the bed to substantially the temperature of the gas, cutting off the supply of warm gas when the heat input to the fractional portion is sufficient to raise the temperature of the entire bed to a temperature at which the adsorbed contaminants will be vaporized, allowing the partially heated bed to stand for a period long enough to permit the heat in the fractional portion of the bed to move by convection and equalize the temperature of the entire bed, then passing enough warm gas through the bed to remove the vaporized contaminants.

14. A method of regenerating a porous bed of silica gel having carbon dioxide and acetylene adsorbed therein at a temperature several hundred degrees below freezing temperature of water comprising passing nitrogen at atmospheric temperature in sufficient volume to raise the temperature of about one-fifth portion of the bed to the temperature of the nitrogen, thereupon cutting off the supply of nitrogen and allowing the bed to stand for a sufficient period to equalize the temperature of the entire bed to vaporize the adsorbed carbon dioxide and acetylene, then passing a small volume of nitrogen through the bed at the equalization temperature to sweep out the vaporized carbon dioxide and acetylene.

15. The method of regenerating a bed of a granular solid adsorption agent having material adsorbed thereon comprising passing through the bed a dry neutral gas having a temperature much higher than the atmosphere at which the adsorbed material in the bed will be vaporized to thereby raise the temperature of a portion of the bed where said gas is admitted to substantially the temperature of the gas, continuing the flow of said gas through the bed until the volume of said heated portion of the bed bears substantially the same relation to the volume of the entire bed as the number of degrees between the temperature of the bed and said vaporization temperature bears to the number of degrees between the temperature of the bed and the temperature of said gas, then stopping said flow of gas and allowing the bed to stand for a period long enough for the heat in said portion to distribute itself by convection uniformly throughout the bed to heat the entire bed to said vaporization temperature, and then passing a further quantity of said gas through the bed to remove the vaporized material therefrom.

IRVING ROBERTS.

REFERENCES CITED

The following references are of record in the file of this patent:

UNITED STATES PATENTS

| Number | Name | Date |
|---|---|---|
| 1,682,588 | Wietzel | Aug. 28, 1928 |
| 2,323,524 | Downs, Jr. | July 6, 1943 |
| 2,359,660 | Martin et al. | Oct. 3, 1944 |
| 2,518,409 | Williamson | Aug. 8, 1950 |